US012759452B2

(12) United States Patent
Tado et al.

(10) Patent No.: US 12,759,452 B2
(45) Date of Patent: Oct. 13, 2026

(54) VEHICLE PART RETAINING STRUCTURE

(71) Applicant: TOYOTA JIDOSHA KABUSHIKI KAISHA, Toyota (JP)

(72) Inventors: Masayuki Tado, Toyota (JP); Yusuke Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 300 days.

(21) Appl. No.: 18/606,441

(22) Filed: Mar. 15, 2024

(65) Prior Publication Data

US 2025/0033545 A1 Jan. 30, 2025

(30) Foreign Application Priority Data

Jul. 27, 2023 (JP) ................................ 2023-122444

(51) Int. Cl.
*B60N 3/02* (2006.01)

(52) U.S. Cl.
CPC .................................... *B60N 3/026* (2013.01)

(58) Field of Classification Search
CPC ...................................................... B60N 3/026
See application file for complete search history.

(56) References Cited

U.S. PATENT DOCUMENTS

| | | | | |
|---|---|---|---|---|
| 7,478,866 B2 * | 1/2009 | Kim | B60N 3/026 296/187.05 |
| 10,434,957 B2 * | 10/2019 | Toriumi | B60R 13/0256 |
| 11,186,237 B2 * | 11/2021 | Eko | B60J 5/0493 |
| 2015/0375689 A1 * | 12/2015 | Nagata | B60R 11/00 296/24.34 |

FOREIGN PATENT DOCUMENTS

| | | | | |
|---|---|---|---|---|
| JP | S62191558 U | * 12/1987 | |
| JP | H10-029453 A | 2/1998 | |
| JP | 2008024089 A | * 2/2008 | B60N 3/026 |
| JP | 2018-118640 A | 8/2018 | |

* cited by examiner

*Primary Examiner* — Faye M Fleming
(74) *Attorney, Agent, or Firm* — SoraIP, Inc.

(57) ABSTRACT

A vehicle part retaining structure for retaining an assist grip to a center console includes an elongated hole provided in a right panel portion and a clip provided in the assist grip, and the clip includes a retaining claw that, when moved downward after being inserted into the elongated hole, retains to a peripheral edge of a lower short side portion of the elongated hole on a back surface of the right panel portion.

3 Claims, 3 Drawing Sheets

VEHICLE PART RETAINING STRUCTURE

CROSS-REFERENCE TO RELATED APPLICATION

This application claims priority to Japanese Patent Application No. 2023-122444 filed on Jul. 27, 2023, incorporated herein by reference in its entirety.

BACKGROUND

1. Technical Field

The present disclosure relates to vehicle part retaining structures that retain a part on a vehicle interior component.

2. Description of Related Art

Japanese Unexamined Patent Application Publication No. 2018-118640 (JP 2018-118640 A) discloses a structure for attaching an assist grip to be gripped by an occupant to a side surface of a center console of a vehicle.

SUMMARY

When attaching an assist grip to a side surface of a center console, the assist grip needs to be attached so that the grip does not come off the center console when an occupant grips the grip. For this purpose, there is a method in which an assist grip is fixed to a center console by bolts etc. However, when an assist grip is fixed to a center console by this method, bolts etc. are visible to an occupant, which may impair appearance.

An interior part is sometimes attached to a vehicle interior component by a clip. In this case, the clip is not visible to an occupant, but the interior part may come off the vehicle interior component.

In view of the above, it is an object of the present disclosure to provide a structure for attaching, without impairing appearance, a part to a vehicle interior component such that the part does not come off the vehicle interior component.

A vehicle part retaining structure of the present disclosure is a vehicle part retaining structure for retaining a part on a vehicle interior component. The vehicle part retaining structure includes:

an elongated hole in a panel portion of the vehicle interior component; and a clip provided in the part, in which the clip includes a retaining claw that is retained by a peripheral edge of a short side portion of the elongated hole on a back surface of the panel portion when the clip is moved in a longitudinal direction of the elongated hole after being inserted through the elongated hole.

This configuration can reduce the possibility of the part coming off the vehicle interior component even when a force in a direction opposite to the insertion direction is applied to the part.

In the vehicle part retaining structure of the present disclosure, the clip may include a body portion in a shape of a plate, and an elastic member that covers both surfaces of the body portion and whose protruding portion engages with peripheral edges of long side portions of the elongated portion when the clip is inserted through the elongated hole, and the retaining claw may be provided in the body portion.

As described above, the clip is retained by the long side portions and short side portion of the elongated hole. This configuration can effectively reduce the possibility of the part coming off the vehicle interior component even when a force in the direction opposite to the insertion direction is applied to the part.

In the vehicle part retaining structure of the present disclosure, the vehicle interior component may be a resin frame of a center console, the part may be an assist grip to be attached to a side surface of the resin frame, the assist grip may include a base portion to be mounted on the side surface of the resin frame and a grip portion attached to an upper part of the base portion, the elongated hole may be provided in an upper part of the resin frame so as to extend in a vehicle up-down direction, the clip may be provided in the upper part of the base portion so as to protrude toward the resin frame, and the retaining claw may be provided in a lower part of the body portion of the clip, and may engage with the peripheral edge of the short side portion on a lower side of the elongated hole when the base portion is moved downward after being moved toward the resin frame to insert the clip through the elongated hole.

Accordingly, even in the case where the assist grip is configured to be attached to a side surface of the center console by moving the assist grip toward the center console, the possibility is reduced of the assist grip coming off in the direction opposite to the insertion direction of the clip when an occupant grips the assist grip. Since the clip is configured to protrude toward the resin frame of the center console, the clip can be made invisible to the occupant, and appearance of the assist grip can be improved.

In the vehicle part retaining structure of the present disclosure, a lower part of the resin frame and a lower part of the base portion may be bolted together.

The assist grip is therefore less likely to move upward. Since an opening for the bolting can be provided in a lower part of the assist grip that is less visible to an occupant, the appearance of the assist grip can be improved.

According to the present disclosure, it is possible to attach, without impairing appearance, a part to a vehicle interior component such that the part does not come off the vehicle interior component.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
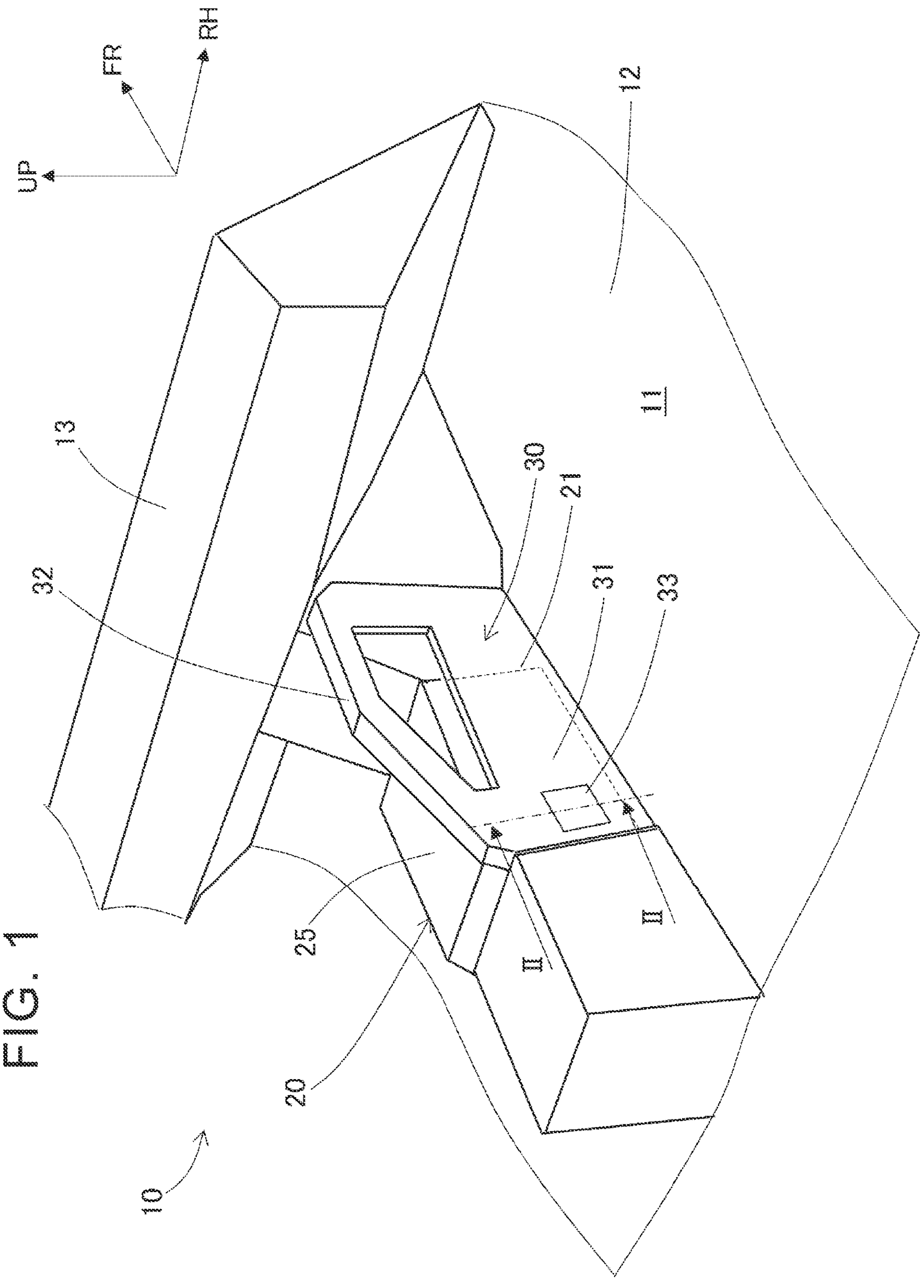
FIG. 1 is a perspective view showing a vehicle cabin in which an assist grip is attached to a side surface of a center console by the vehicle part retaining structure of the present disclosure.

Hereinafter, the vehicle part retaining structure 100 according to the embodiment will be described with reference to the drawings. The arrows FR, the arrows UP, and the arrows RH shown in the drawings indicate the front side, the upper side, and the right side of the vehicle 10, respectively. Further, directions opposite to each of the arrows FR, UP, and RH indicate a rear side, a lower side, and a left side, respectively. Hereinafter, in the case where the front-rear direction, the left-right direction, and the up-down direction are simply used and described, the front-rear direction, the left-right direction, and the up-down direction of the vehicle 10 in the front-rear direction, and the up-down direction are illustrated unless otherwise specified.

As illustrated in FIG. 1, an instrument panel 13, a center console 20, and an assist grip 30 are disposed in a vehicle cabin 11 of a vehicle 10. The instrument panel 13 is disposed in front of the vehicle cabin 11, and is a vehicle interior component to which an instrument etc. is attached. The center console 20 is provided at the center of the vehicle cabin 11 in the vehicle width direction. The center console 20 is a square box-shaped vehicle interior component that is disposed below the instrument panel 13, protrudes upward from the floor 12, and extends in the vehicle front-rear direction. The center console 20 includes a lower resin frame 21 and an upper cover 25. The assist grip 30 is attached to the right side surface of the center console 20. The assist grip 30 includes a base portion 31 and a grip portion 32. The base portion 31 is a portion assembled to the right side surface of the center console 20. The grip portion 32 is attached to an upper portion of the base portion 31 and is a portion gripped by an occupant. The vehicle 10 illustrated in FIG. 1 is a left-handed vehicle, and the assist grip 30 is configured to be gripped by an occupant in a passenger seat. A cover 33 that closes the opening 39 (see FIG. 2) is attached to the right side surface of the lower portion of the base portion 31.

Figure 2:
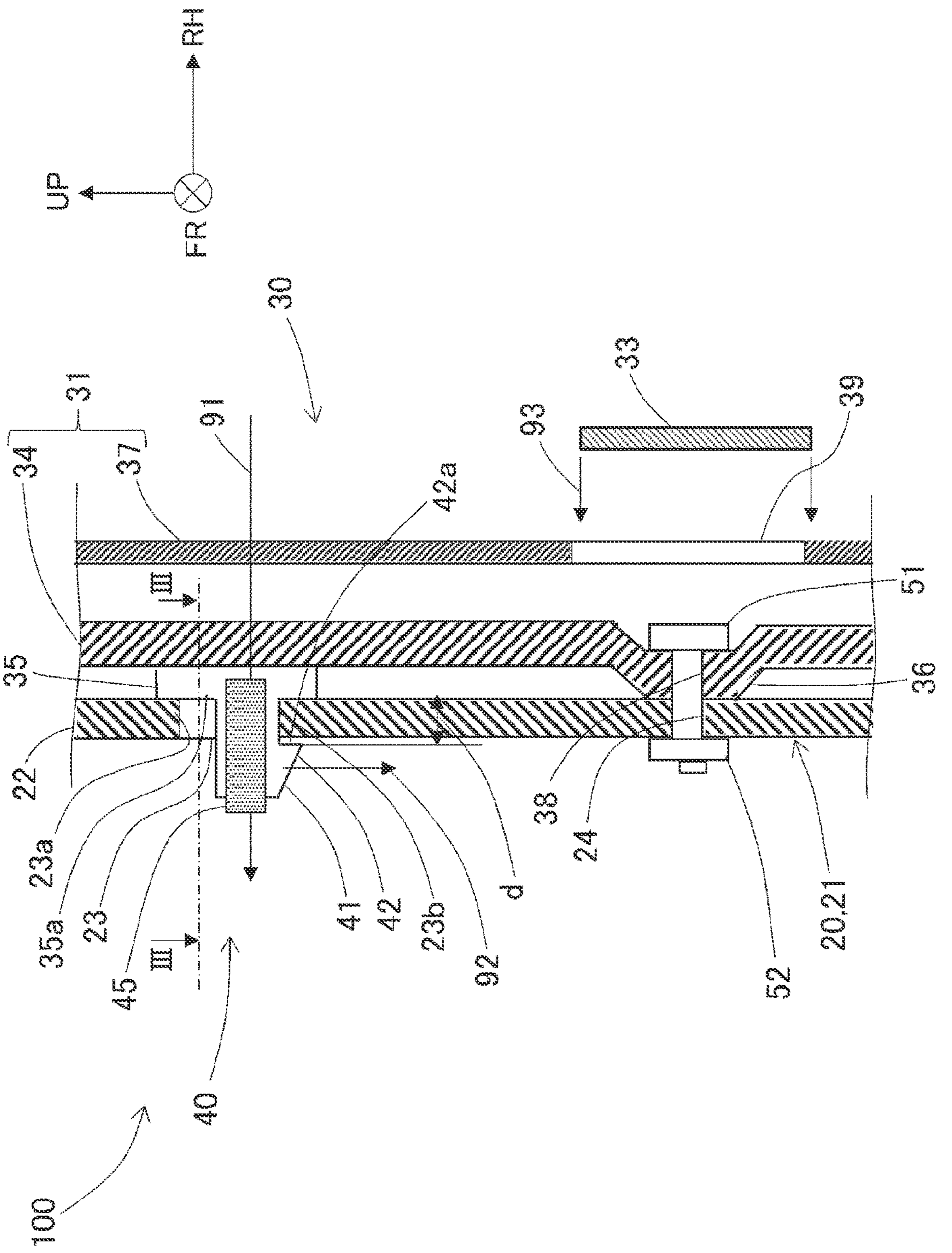
FIG. 2 is a sectional view of the vehicle part retaining structure taken along line II-II in FIG. 1.

As shown in FIG. 2, the right side of the resin frame 21 of the center console 20 is a plate-shaped right panel portion 22. An elongated hole 23 extending in the vehicle up-down direction is provided in an upper portion of the right panel portion 22. That is, the up-down direction of the elongated hole 23 is the longitudinal direction of the elongated hole 23. The elongated hole 23 is a square hole that is longer in the up-down direction than in the front-rear direction, and includes an upper short side portion 23*a*, a lower short side portion 23*b*, a front long side portion 23*c*, and a rear long side portion 23*d* (see FIG. 3). A bolt hole 24 is provided in a lower portion of the right panel portion 22.

The base portion 31 of the assist grip 30 includes a base plate portion 34 on the side of the center console 20, and a design panel 37 that faces the vehicle cabin 11 and constitutes a design surface on the right side of the base portion 31. The base plate portion 34 is made of resin and is a strength member attached to the right panel portion 22 of the resin frame 21. A grip portion 32 is connected to an upper portion of the base plate portion 34.

A clip 40 is provided at an upper portion of the base plate portion 34. The clip 40 includes a plate-shaped main body portion 41 and an elastic member 45. The main body portion 41 is configured to protrude from the front end surface 35*a* of the base 35 of the base plate portion 34 toward the resin frame 21. The main body portion 41 and the base 35 are made of resin and are integrally formed with the base plate portion 34. A retaining claw 42 is provided at a lower portion of the main body portion 41 on the side of the center console 20. A length d of the front end surface 35*a* of the base 35 and the retaining surface 42*a* of the retaining claw 42 is slightly longer than the thickness of the right-panel portion 22. Further, the length in the up-down direction between the lower end of the retaining claw 42 and the upper end of the body portion 41 is shorter than the length in the up-down direction of the elongated hole 23. The thickness of the main body portion 41 is shorter than the length of the elongated hole 23 in the front-rear direction.

A bolt receiving portion 36 is formed under the base plate portion 34. The bolt receiving portion 36 protrudes toward the center console 20 so as to be in contact with the surface of the right panel portion 22. A bolt hole 38 is provided in the center of the bolt receiving portion 36.

An opening 39 through which the bolt 51 is inserted is provided in a lower portion of the design panel 37. A cover 33 is attached to the opening 39.

Figure 3:
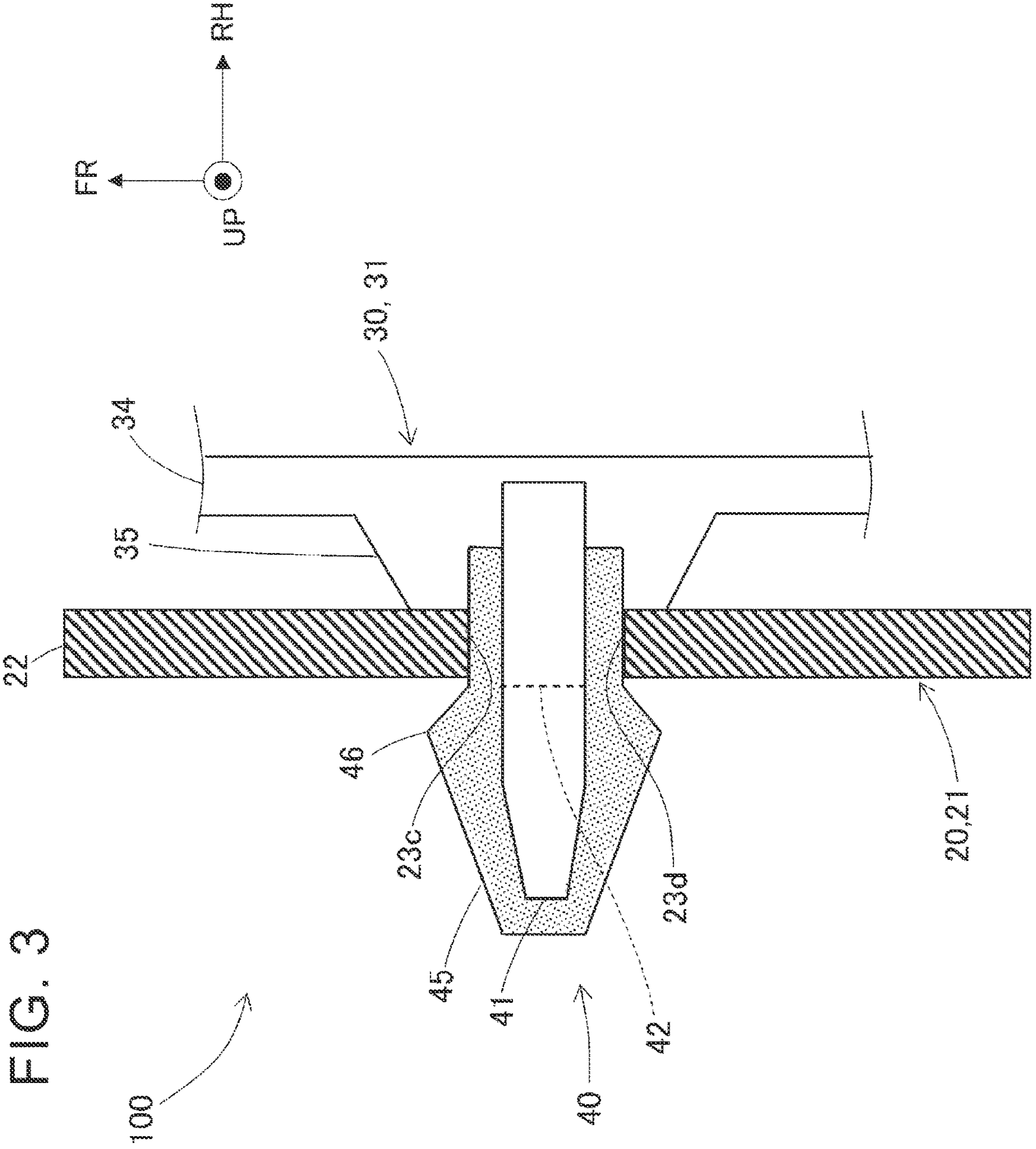
FIG. 3 is a top sectional view of the vehicle part retaining structure taken along line III-III in FIG. 2.

As shown in FIG. 3, the elastic member 45 is attached to the main body portion 41 so as to cover both surfaces of the plate-shaped main body portion 41. The elastic member 45 includes a protruding portion 46 protruding forward or backward such that the width in the front-rear direction is larger than the width in the front-rear direction of the elongated hole 23.

The elongated hole 23 provided in the right panel portion 22 of the center console 20 shown in FIGS. 2 and 3 and the clip 40 provided in the assist grip 30 described above constitute the vehicle part retaining structure 100.

Next, a procedure in which the assist grip 30 is assembled to the center console 20 will be described.

As shown by an arrow 91 in FIG. 2, the base portion 31 is moved leftward toward the resin frame 21, and the clip 40 is inserted into the elongated hole 23. When the clip 40 is inserted into the elongated hole 23, the protruding portion 46 of the elastic member 45 is compressed by the front long side portion 23*c* and the rear long side portion 23*d* of the elongated hole 23 and passes through the elongated hole 23. When the front end surface 35*a* of the base 35 comes into contact with the right surface of the right panel portion 22, the insertion of the clip 40 is completed. When the insertion of the clip 40 is completed, the compressed elastic member 45 is restored to its original size, the back surfaces of the front long side portion 23*c* and the rear long side portion 23*d* of the right panel portion 22, or engaged with the inner surface of the resin frame 21.

Further, as indicated by an arrow 91 in FIG. 2, when the insertion of the clip 40 is completed, the retaining surface 42*a* of the retaining claw 42 protrudes to the back surface of the right-panel portion 22 or the inner surface of the resin frame 21. In this condition, when the base portion 31 is moved downward, the retaining surface 42*a* engages with the back surface of the right panel portion 22 or the peripheral edge of the lower short side portion 23*b* on the inner surface of the resin frame 21. Further, the positions of the bolt holes 38 provided in the base plate portion 34 and the bolt holes 24 of the right panel portion 22 coincide with each other. In this state, the bolt 51 is inserted into the bolt holes 24 and 38, and is screwed into the nut 52, whereby the base portion 31 is fixed to the right side surface of the center console 20. Thereafter, the cover 33 is attached to the design panel 37 so as to close the opening 39.

The base portion 31 assembled to the right side surface of the center console 20 as described above, the retaining claws 42 of the clip 40 provided on the upper portion is engaged with the peripheral edge of the lower short side portion 23*b* of the back surface of the right panel portion 22. Therefore, even when the occupant pulls the upper grip portion 32 in the right direction opposite to the insertion direction of the clip 40, it is possible to prevent the assist grip 30 from being detached from the center console 20.

In addition, since the clip 40 is not visible to the occupant and the position of the cover 33 that hides the bolt 51 is arranged at a lower portion that is difficult to see, the appearance of the side surface of the assist grip 30 is improved. Further, since the base portion 31 is fixed to the right panel portion 22 by the bolt 51, even when the occupant pulls the upper grip portion 32 upward, the clip 40 moves upward to prevent the retaining claw 42 from being disengaged.

As described above, the vehicle part retaining structure 100 of the embodiment can be attached so that the assist grip 30 does not come off from the center console 20 without impairing the appearance.

Although the vehicle part retaining structure 100 has been described above as retaining the assist grip 30 to the center console 20, the present disclosure is not limited thereto, and may be applied to a case where other parts are retained on other vehicle interior components. Also. In this case, the retaining claw 42 need only be retained in the vehicle interior component by moving the part in the longitudinal direction of the elongated hole, and the retaining claw 42 may be retained by moving the part in the upward direction and the lateral direction, namely in a direction other than the downward direction.

What is claimed is:

1. A vehicle part retaining structure for retaining a part on a vehicle interior component, the vehicle part retaining structure comprising:

an elongated hole in a panel portion of the vehicle interior component; and a clip provided in the part, wherein the clip includes a retaining claw that is retained by a peripheral edge of a short side portion of the elongated hole on a back surface of the panel portion when the clip is moved in a longitudinal direction of the elongated hole after being inserted through the elongated hole, the clip further includes a body portion in a shape of a plate, and an elastic member that covers both surfaces of the body portion and whose protruding portion engages with peripheral edges of long side portions of the elongated hole when the clip is inserted through the elongated hole, and the retaining claw is provided in the body portion.

2. The vehicle part retaining structure according to claim 1, wherein:

the vehicle interior component is a resin frame of a center console;

the part is an assist grip to be attached to a side surface of the resin frame;

the assist grip includes a base portion to be mounted on the side surface of the resin frame and a grip portion attached to an upper part of the base portion;

the elongated hole is provided in an upper part of the resin frame so as to extend in a vehicle up-down direction;

the clip is provided in the upper part of the base portion so as to protrude toward the resin frame; and the retaining claw is provided in a lower part of the body portion of the clip, and engages with the peripheral edge of the short side portion on a lower side of the elongated hole when the base portion is moved downward after being moved toward the resin frame to insert the clip through the elongated hole.

3. The vehicle part retaining structure according to claim 2, wherein a lower part of the resin frame and a lower part of the base portion are bolted together.

* * * * *